(12) United States Patent
Iwasaki et al.

(10) Patent No.: US 8,797,253 B2
(45) Date of Patent: Aug. 5, 2014

(54) LIQUID CRYSTAL DISPLAY DEVICE

(75) Inventors: Kohji Iwasaki, Osaka (JP); Motoyuki Oniki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 216 days.

(21) Appl. No.: 13/382,857

(22) PCT Filed: Jul. 6, 2010

(86) PCT No.: PCT/JP2010/061450
§ 371 (c)(1),
(2), (4) Date: Jan. 6, 2012

(87) PCT Pub. No.: WO2011/004809
PCT Pub. Date: Jan. 13, 2011

(65) Prior Publication Data
US 2012/0105515 A1 May 3, 2012

(30) Foreign Application Priority Data

Jul. 7, 2009 (JP) .................................. 2009-160780
Jul. 5, 2010 (JP) .................................. 2010-153312

(51) Int. Cl.
*G09G 3/36* (2006.01)
(52) U.S. Cl.
USPC ............... 345/102; 345/77; 345/89; 345/690; 362/97.1; 362/97.3
(58) Field of Classification Search
USPC ............... 345/102, 89, 690, 204, 77, 83, 207, 345/211; 362/97.1–97.3; 348/739, 571, 552
See application file for complete search history.

(56) References Cited

U.S. PATENT DOCUMENTS 7,312,783 B2 * 12/2007 Oyama .......................... 345/102
7,728,808 B2 * 6/2010 Kim ............................... 345/102
(Continued)

FOREIGN PATENT DOCUMENTS

EP        1 986 470 A2    10/2008
JP       2006-235565 A     9/2006
(Continued)

OTHER PUBLICATIONS

International Search Report, dated Oct. 19, 2010, issued in PCT/JP2010/061450.

(Continued)

*Primary Examiner* — Lun-Yi Lao
*Assistant Examiner* — Kelly B Hegarty
(74) *Attorney, Agent, or Firm* — Birch, Stewart, Kolasch & Birch, LLP

(57) ABSTRACT

In an LCD device, picture quality luminance is controlled through the combination of pulse-width modulation (PWM) system and current value control system, reducing the electrical power consumption associated with turning on an LED. In the LED backlight, the light emitting luminance of the LED is controlled by both PWM and also by current value control, which selects the value of the current supplied to the LED from a plurality of set values. At least one of the plurality of set values is a predetermined current value at which duty reaches a maximum value at the maximum luminance value used in a specified picture quality mode of the picture quality modes established in the liquid crystal display device. In the aforementioned specified picture quality mode, the greatest luminance value to be used is smaller than at least the greatest luminance value used in other specified picture quality modes.

6 Claims, 10 Drawing Sheets

(56) References Cited

U.S. PATENT DOCUMENTS

| | | | |
|---|---|---|---|
| 8,111,020 B2* | 2/2012 | Furukawa et al. | 315/309 |
| 8,294,387 B2* | 10/2012 | Hamada | 315/297 |
| 2002/0063534 A1 | 5/2002 | Min | |
| 2003/0214242 A1* | 11/2003 | Berg-johansen | 315/169.3 |
| 2005/0057554 A1* | 3/2005 | Yamamoto et al. | 345/211 |
| 2005/0128751 A1* | 6/2005 | Roberge et al. | 362/276 |
| 2005/0189885 A1* | 9/2005 | Haruna et al. | 315/291 |
| 2005/0190142 A1* | 9/2005 | Ferguson | 345/102 |
| 2006/0082538 A1* | 4/2006 | Oyama | 345/102 |
| 2006/0146005 A1* | 7/2006 | Baba et al. | 345/102 |
| 2006/0187181 A1* | 8/2006 | Kim | 345/102 |
| 2009/0021178 A1* | 1/2009 | Furukawa et al. | 315/250 |
| 2010/0045190 A1* | 2/2010 | Cramer | 315/151 |
| 2010/0060674 A1* | 3/2010 | Yoshida et al. | 345/690 |
| 2010/0220049 A1* | 9/2010 | Murakami | 345/102 |
| 2010/0295861 A1* | 11/2010 | Somerville et al. | 345/545 |
| 2011/0012937 A1* | 1/2011 | Onishi et al. | 345/690 |
| 2011/0316902 A1* | 12/2011 | Onishi et al. | 345/690 |
| 2012/0007844 A1* | 1/2012 | Nakanishi et al. | 345/204 |
| 2012/0086628 A1* | 4/2012 | Ichioka et al. | 345/102 |
| 2012/0086684 A1* | 4/2012 | Ichioka et al. | 345/207 |
| 2012/0086740 A1* | 4/2012 | Murai et al. | 345/690 |
| 2012/0256818 A1* | 10/2012 | Kuroki | 345/102 |
| 2012/0327139 A1* | 12/2012 | Margulis | 345/690 |
| 2013/0050280 A1* | 2/2013 | Huang | 345/690 |

FOREIGN PATENT DOCUMENTS

| | | |
|---|---|---|
| JP | 2007-322945 A | 12/2007 |
| JP | 2008-102442 A | 5/2008 |
| JP | 2010-60746 A | 3/2010 |
| WO | WO 2009/077951 A1 | 6/2009 |

OTHER PUBLICATIONS

European Search Report for application No. 10797120.2, dated Nov. 21, 2012.

* cited by examiner

FIG.3

| LIGHT MODULATION SETTING | LUMINANCE RATIO | Duty TABLE a | Duty TABLE b |
|---|---|---|---|
| MAXIMUM | 100% | 100% | 100% |
| ↑ | 95% | 95% | 100% |
|  | ... | ... | 100% |
| ±0 | 60% | 60% | 100% |
|  | ... | ... | ... |
| ↓ | 25% | 25% | 42% |
| MINIMUM | 20% | 20% | 33% |

FIG.4

|  | DYNAMIC MODE | STANDARD MODE |
|---|---|---|
| LED CURRENT | I1 | I2 |
| PWM Duty TABLE | Duty TABLE a | Duty TABLE b |

FIG.6
(A)
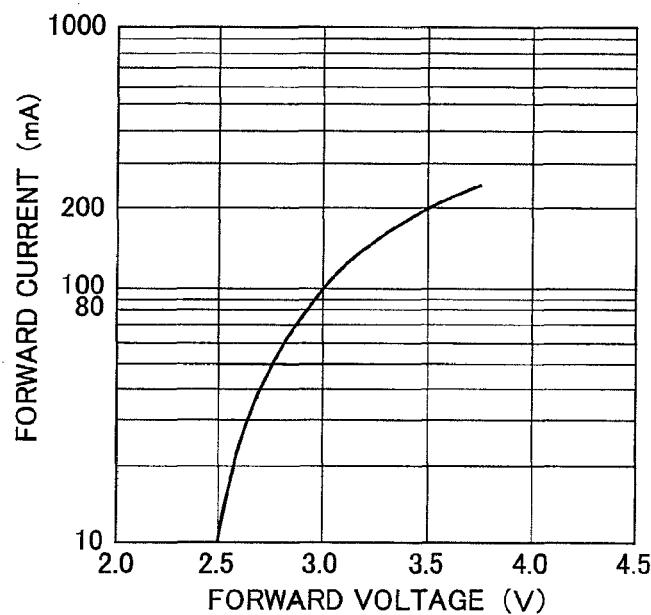
(B)
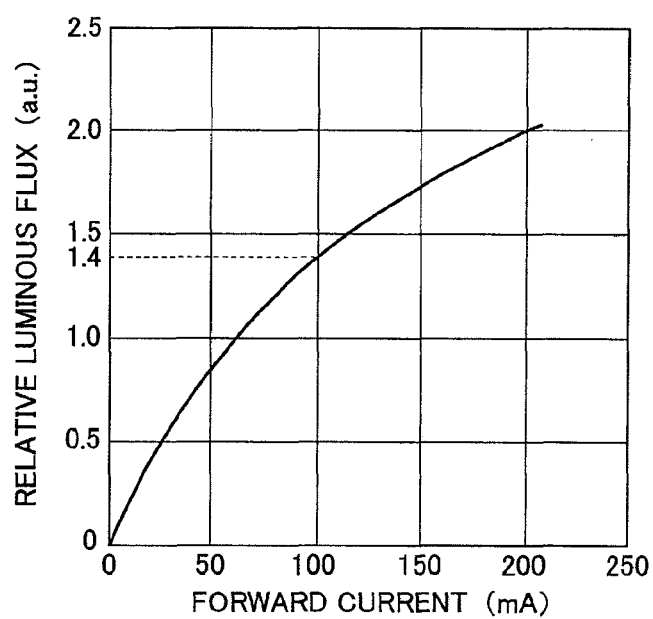

FIG.10

| AV POSITION / LIGHT MODULATION VALUE | ECO MODE: OFF | | | | ECO MODE: MODE 1 | | | | ECO MODE: MODE 2 | | | |
|---|---|---|---|---|---|---|---|---|---|---|---|---|
| | OTHER THAN STANDARD MODE | | STANDARD MODE | | OTHER THAN STANDARD MODE | | STANDARD MODE | | OTHER THAN STANDARD MODE | | STANDARD MODE | |
| | CURRENT | Duty | CURRENT | Duty | CURRENT | Duty | CURRENT | Duty | CURRENT | Duty | CURRENT | Duty |
| 16 | 100% | 100% | 100% | 100% | 80% | 100% | 80% | 100% | 60% | 100% | 60% | 100% |
| ... | | ... | | ... | | ... | | ... | | ... | | ... |
| 8 | | 80% | | 80% | | 80% | | 80% | | 80% | | 80% |
| ... | | ... | | ... | | ... | | ... | | ... | | ... |
| 1 | | 63% | | 63% | | 63% | | 63% | | 63% | | 63% |
| 0 | | 60% | 50% | 100% | | 60% | 40% | 100% | | 60% | 30% | 100% |
| ... | | ... | | ... | | ... | | ... | | ... | | ... |
| −8 | | 40% | | 65% | | 40% | | 65% | | 40% | | 65% |
| ... | | ... | | ... | | ... | | ... | | ... | | ... |
| −16 | | 20% | | 30% | | 20% | | 30% | | 20% | | 30% |

100

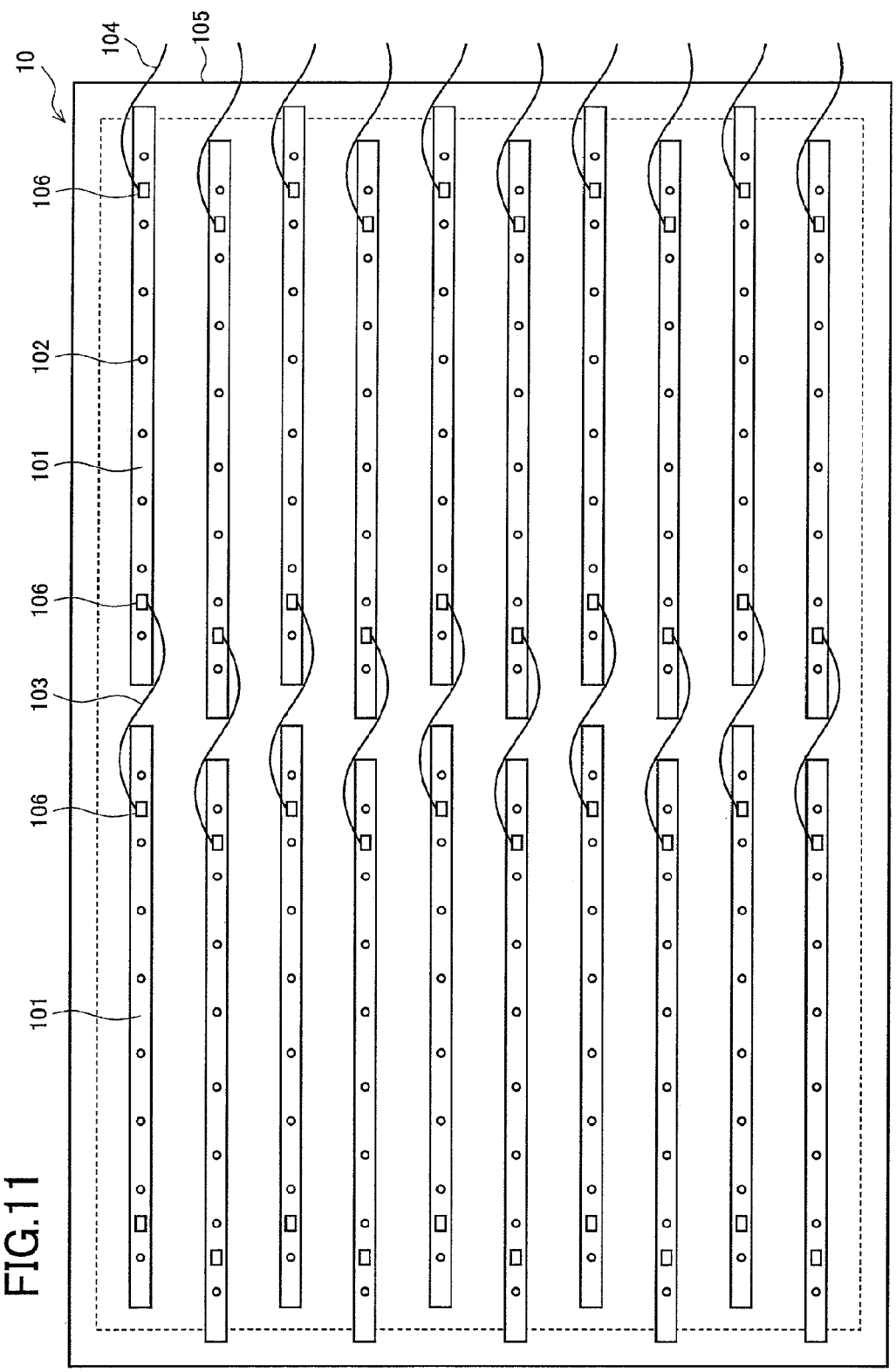

LIQUID CRYSTAL DISPLAY DEVICE

TECHNICAL FIELD

The present invention relates to a liquid crystal display device, and more particularly to a liquid crystal display device provided with a liquid crystal panel and a light source of a light-emitting diode for irradiating the liquid crystal panel.

BACKGROUND OF THE INVENTION

In recent years, energy saving has been given importance, and also in a liquid crystal display device (Liquid Crystal Display) having a liquid crystal panel, reduction in power consumption has been an important theme.

Furthermore, a commercial product using a light source of a light-emitting diode (LED) as a backlight in a liquid crystal display device has been sold.

A light emission luminance adjustment system of the LED backlight includes a Pulse Width Modulation (PWM) system and a current value control system. Since the PWM system is for performing time control, control thereby is highly accurate and fine control is able to be performed. On the other hand, the current value control system is higher in power efficiency than the PWM system, however, is not suitable for fine control, thereby performs stepwise control since a control width is not able to be finer as the PWM system, and correction is needed in the case of performing linear control.

Patent document 1 discloses a liquid crystal display device provided with a backlight driving portion for supplying R, G and B driving currents and R, G and B PWM signals to an LED backlight portion and for controlling light emission luminance and chromaticity of each of R, G and B backlights, and a timing controller for controlling an operation of a scan driver, a source driver and the backlight driving portion.

RELATED ART DOCUMENTS

Patent Documents

[Patent document 1] Japanese Laid-Open Patent Publication No. 2006-235565

DISCLOSURE OF THE INVENTION

Problems to be Solved by the Invention

However, in the conventional LED backlight including the technology described in the patent document 1, only the luminance control by the PWM system and the luminance control by the current value control system are able to be performed. Therefore, it has not been considered, in the case of being incorporated as a product to actually display an image, that specifically how both of these are combined to preferably perform luminance control for providing a picture quality suitable for viewing as well as for preferably reducing power consumption. It is thus required a specific mechanism of how the combination be made in the case of including both the luminance control to a product.

The present invention has been made in view of the above-described circumstance, and aims to reduce power consumption concerning lighting of an LED when control on luminance according to a picture quality is performed by combining a PWM system and a current value control system in a liquid crystal display device provided with a backlight light source of an LED.

Means for Solving the Problem

To solve the problems, a first technical means of one aspect of the present invention is a liquid crystal display device having a liquid crystal panel for displaying an input video signal, a light source of a light-emitting diode for irradiating the liquid crystal panel, and a light emission luminance control portion for controlling light emission luminance of the light-emitting diode, wherein, the light emission luminance control portion controls the light emission luminance of the light-emitting diode with both a Pulse Width Modulation system in which duty indicating a lighting time per cycle in a pulse to turn on/off the light-emitting diode is changed, and a current value control system in which a value of a current to be flowed to the light-emitting diode is selected from among a plurality of setting values, at least one among the plurality of setting values is a predetermined current value which the duty becomes a maximum value at a maximum luminance value used in a specific picture quality mode among picture quality modes set in the liquid crystal display device, and the specific picture quality mode is a picture quality mode in which the maximum luminance value to be used is at least smaller than a maximum luminance value to be used in another specific picture quality mode.

A second technical means is the liquid crystal display device as defined in the first technical means, wherein the specific picture quality mode is a picture quality mode which is provided as a mode most frequently used by a user.

A third technical means is the liquid crystal display device as defined in the first technical means, wherein during an operation in the specific picture quality mode, the light emission luminance control portion performs control by using a current value to be used in the another specific picture quality mode when there is a need to change a luminance value to one exceeding the maximum luminance value.

A fourth technical means is the liquid crystal display device as defined in the third technical means, wherein during an operation in the another specific picture quality mode, the light emission luminance control portion performs control by using a current value to be used in the specific picture quality mode when there is a need to change a luminance value to one less than the maximum luminance value.

A fifth technical means is the liquid crystal display device as defined in the third or fourth technical means, wherein when changing a current value, the light emission luminance control portion changes the current value and the duty concurrently and gradually.

Effects of the Invention

According to the present invention, in a liquid crystal display device provided with a backlight light source of an LED, by combining a PWM system and a current value control system, power consumption is able to be reduced by lighting an LED efficiently according to a picture quality mode.

BRIEF DESCRIPTION OF DRAWINGS

FIG. 3 is a diagram showing an example of a PWM Duty table in the LED backlight of FIG. 2.

FIG. 4 is a diagram showing an example of an LED current table in the LED backlight of FIG. 2.

FIG. 6 is a diagram showing an example of a characteristic of forward voltage-forward current and a characteristic of forward current-relative luminous flux in an LED.

FIG. 10 is a diagram for explaining another example of the PWM Duty table in the LED backlight of FIG. 2.

FIG. 11 is a diagram showing an arrangement example of a backlight applicable to the liquid crystal display device of the present invention.

PREFERRED EMBODIMENTS OF THE INVENTION

Figure 1:
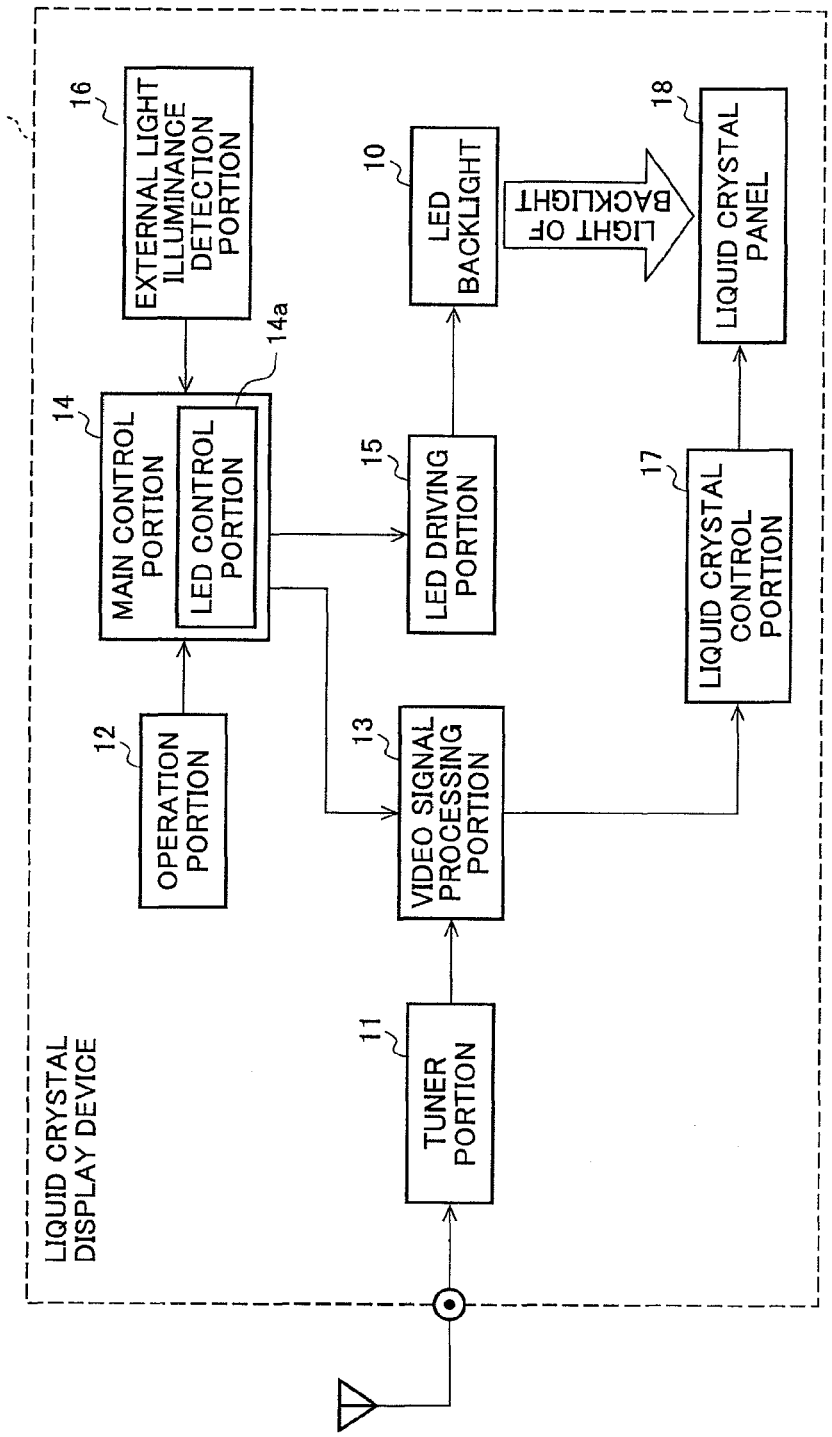
FIG. 1 is a block diagram showing a schematic configuration example of a liquid crystal display device according to the present invention.

FIG. 1 is a block diagram showing a schematic configuration example of a liquid crystal display device according to the present invention. A liquid crystal display device 1 is provided with, in addition to an LED backlight 10, a tuner portion 11, an operation portion 12, a video signal processing portion 13, a main control portion 14, an LED driving portion 15, an external light illuminance detection portion 16, a liquid crystal control portion 17, and a liquid crystal panel 18.

The main control portion 14 directly or indirectly controls whole portions inside the liquid crystal display device 1 including the video signal processing portion 13, the LED driving portion 15 and the like. Among them, a part for controlling the LED driving portion 15 is described as an LED control portion 14a. Additionally, the control portion 12, as long as capable of receiving a user operation and transmitting content of the operation to the main control portion 14, may be composed of a main body operation portion provided on a main body of the liquid crystal display device 1 as a button or the like, and a receiving portion for receiving an operation signal from an attached remote controller. Of course, as the operation portion 12, either one of the main body operation portion or the receiving portion only may be provided.

The tuner portion 11 is connected to an antenna input terminal of an antenna for receiving broadcast wave, demodulates the broadcast wave input from the antenna input terminal to be output to the video signal processing portion 13. The video signal processing portion 13 performs various signal conversion processing for displaying the video signal input from the tuner portion 11 on the liquid crystal panel 18. The tuner portion 11 or the like is provided so that the liquid crystal display device is able to be configured as a liquid crystal television device.

Furthermore, some liquid crystal display devices 1 include an output mode in which a state of a video picture or sound is able to be set to a state desired by a user. For example, a television device is an example thereof. The output mode may be also referred to as an AV position, and may be also referred to as a picture quality mode since a picture quality is changed for each output mode.

As the output mode described above, for example, a "standard mode", a "dynamic mode", a "game mode", a "PC mode", an "AV memory mode", a "movie mode" and the like are set.

The "standard mode" is a mode showing a setting of the picture quality/sound is a standard value. Further, in the "dynamic mode", sport programs or the like are able to be viewed as one with full of impact with the clear and vivid video picture. The dynamic mode may be used as a demonstration mode (also referred to as shop front mode) for giving publicity to a feature of the device at a shop front of a dealer, for example. Usually, the dynamic mode is executed with best picture quality and brightness prepared for the video picture display device.

Furthermore, the "game mode" is a mode in which a video picture of a video game or the like is displayed in an eye-friendly manner by suppressing the brightness, and the "PC mode" is a screen mode for a PC. Additionally, the "AV memory mode" is a mode in which arbitrary adjustment content is able to be stored for each input. The "movie mode" is a mode in which a signal included in a movie source is extracted as it is and reproduced faithfully to a luminance characteristic and a color characteristic so as to express film feeling.

The liquid crystal display device 1 according to the present invention has a plurality of picture quality modes such as the illustrated output modes, and it is possible to select one picture quality mode among them. The selection of the picture quality mode may be performed with a selection operation by a user from the operation portion 12, however, may also be performed automatically based on a result of discrimination performed with types and features of the video picture shown by the video signal in the video signal processing portion 13 or the like.

In the video signal processing portion 13, then, various video processing in conformity to the selected picture quality mode is performed and output to the liquid crystal control portion 17.

The liquid crystal control portion 17 performs control to write a video signal output from the video signal processing portion 13 sequentially from an upper most line of the liquid crystal panel 18. On the liquid crystal panel 18, a vertical scanning for writing and updating a sequential scanning video signal is performed. The written video signal is held for an amount of one frame. By such writing, a video picture shown by the input video signal is displayed on the liquid crystal panel 18. At the time, the video picture is displayed in the picture quality of the selected picture quality mode.

The liquid crystal panel 18 is a non-self-luminous type panel, and in the liquid crystal display device 1, a light source is provided for irradiating with light from backside thereof for visual recognition of the displayed video picture. In the liquid crystal display device 1 according to the present invention, an LED backlight 10 is provided as the light source.

The external light illuminance detection portion 16 is comprised of an OPC (Optical Picture Control) sensor (also referred to as brightness sensor) for detecting illuminance of external light around the liquid crystal display device 1 and the like. Depending on the illuminance of the external light around the liquid crystal display device 1 detected by the OPC sensor, it is possible to increase or decrease light emission luminance in the LED of the LED backlight 10. Of course, the liquid crystal display device 1 may not be provided with the external light illuminance detection portion 16.

The main control portion 14 transmits a light modulation control signal and a mode switching signal to an LED control portion 14a inside thereof so that the LED control portion 14a controls light emission of the LED backlight 10 through the LED driving portion 15.

The light modulation control signal is generated as a signal showing a light modulation setting value based on a result of an operation of brightness adjustment (light modulation operation) by the operation portion 12 or a detection result by the external light illuminance detection portion 16. Moreover, the mode switching signal is a signal showing a picture quality mode after being switched. That is, a signal showing a mode according to the mode switching (selection) operation by a user in the operation portion 12, a signal showing a picture quality mode that is automatically determined based on the video picture by discrimination performed with types and features of the video picture shown by the video signal or the like corresponds to the mode switching signal.

Figure 2:
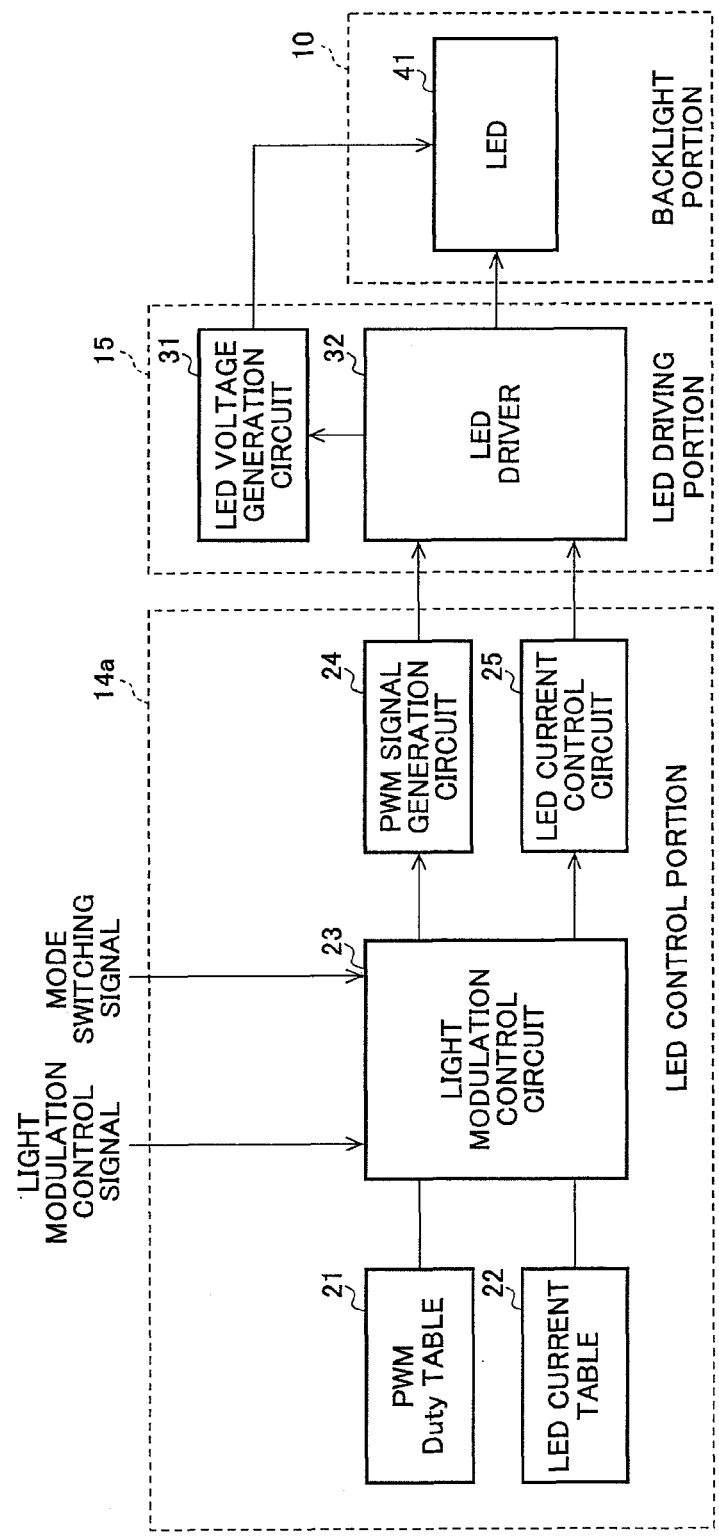
FIG. 2 is a block diagram showing a configuration example of a part related to an LED backlight in the liquid crystal display device of FIG. 1.
Figure 5:
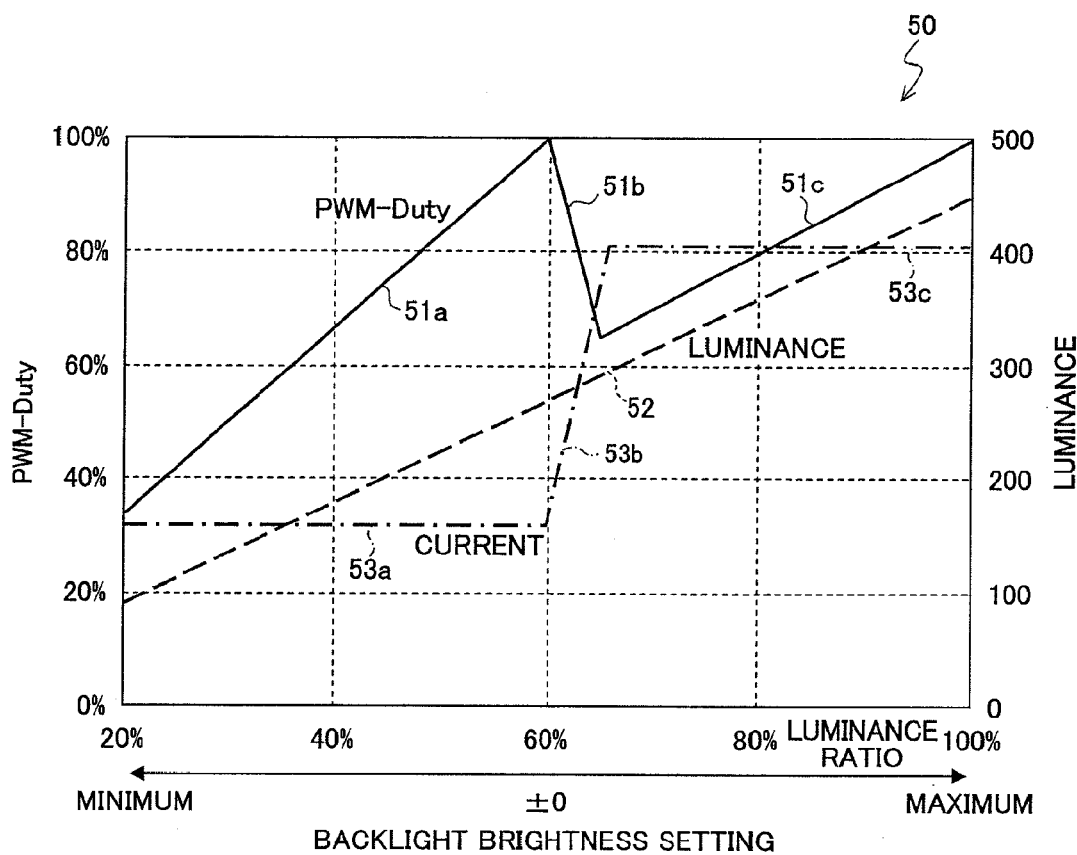
FIG. 5 is a diagram for explaining an example of a light emission luminance control method in a standard mode in the LED backlight of FIG. 2, and the diagram showing an example of a relation between a PWM-Duty in the standard mode using the tables in FIG. 3 and FIG. 4, a maximum current and luminance in an LED current control circuit of FIG. 2.

Next, a configuration example and a control example of the LED backlight 10 will be described with reference to FIG. 2 to FIG. 6. FIG. 2 is a block diagram showing a configuration example of a part related to the LED backlight in the liquid crystal display device of FIG. 1. In addition, FIG. 3 and FIG. 4 are diagrams respectively showing an example of a PWM Duty table and an LED current table in the LED backlight of FIG. 2. Furthermore, FIG. 5 is a diagram for explaining an example of a light emission luminance control method in the standard mode in the LED backlight of FIG. 2.

A part related to the LED backlight illustrated in FIG. 2 is composed of the light emission luminance control portion and the LED backlight (referred to as backlight portion) 10 having an LED 41. The light emission luminance control portion is comprised of the LED control portion 14a and the LED driving portion 15.

The LED control portion 14a controls the light emission luminance of the LED 41 with both the Pulse Width Modulation (PWM) system and the current value control system. The PWM system is the system in which duty indicating a lighting time per cycle in a pulse to turn on/off the LED 41 (hereinafter, referred to as lighting duty) is changed. Here, in a case where a cycle of lighting/lighting out the LED 41 is T, and a lighting term in a cycle is τ, lighting duty D is thus able to be represented by D=τ/T. Note that, the lighting duty may be referred to as a duty ratio.

The current value control system is the system in which a value of a current to be flowed to the LED 41 (forward direction current value) is selected from among a plurality of setting values. Note that, the setting value may also be defined with a voltage value for obtaining the current value.

Then, in the present invention, at least one among the plurality of setting values is a predetermined current value with lighting duty becoming a maximum value at a maximum luminance value for use in a specific picture quality mode among picture quality modes set in the liquid crystal display device 1 (a maximum luminance value which is defined by a designer to normally use in a specific picture quality mode). That is, in the specific picture quality mode, from the minimum luminance value which is set in advance to the maximum luminance value described above, the lighting duty may be controlled to gradually increase from the minimum value (the minimum value of the lighting duty for outputting a minimum luminance value at the predetermined current value described above) to the maximum value using the predetermined current value. Hereinafter, although a case where the lighting duty is 100% as the maximum value described above is taken as an example and explained, any value that is determined as the maximum value of the lighting duty for use in the liquid crystal display device 1 is available.

Here, the above-described specific picture quality mode is a picture quality mode in which the maximum luminance value for use is at least smaller than a maximum luminance value for use in another specific picture quality mode. That is, in the liquid crystal display device 1, adding to the above-described specific picture quality mode, a picture quality mode is settable in which a maximum luminance value for use is different and the maximum luminance value for use is larger. The larger picture quality mode corresponds to the dynamic mode in the above-described example. Namely, the above-described specific picture quality mode is not the dynamic mode. Of course, it is preferable to perform such control in the dynamic mode also, namely, control at a current value at which the lighting duty becomes 100% at the maximum luminance value for use.

It is preferable that the above-described specific picture quality mode is a picture quality mode which is set as a mode most frequently used by a user. Such picture quality mode corresponds to the standard mode in the above-described example. Hereinafter, although a case where the standard mode is employed as the above-described specific picture quality mode is taken as an example and explained, a case of employing another picture quality mode also applies.

A configuration example of the LED control portion 14a for performing such control will be described. The LED control portion 14a is provided with a light modulation control circuit 23, a PWM signal generation circuit 24 and an LED current control circuit 25. The LED control portion 14a further includes a memory for storing a PWM Duty table 21 and an LED current table 22.

The PWM Duty table 21 includes a plurality of tables as illustrated as a Duty table a and a Duty table b in FIG. 3. Then, in each table, a light modulation setting value (corresponding to a value changed in user light modulation or OPC light modulation), a luminance ratio in the case of performing light modulation with each light modulation setting value, and lighting duty are related to each other.

As illustrated in FIG. 4, in the LED current table 22, a current value for use in each picture quality mode is described, and a Duty table for use in each picture quality mode is further described. In this example, it is described that in the dynamic mode, lighting duty is controlled according to the Duty table a using I1 as the current value, and that in the standard mode, lighting duty is controlled according to the Duty table b using I2 (I2<I1) as the current value.

The light modulation control circuit 23 determines a current value and a PWM Duty table for use in control by the mode indicated by the mode switching signal (or a latest mode switching signal) with reference to the LED current table 22. Further, the light modulation control circuit 23 determines lighting duty for use in control from the light modulation setting value indicated by the light modulation control signal with reference to a PWM Duty table which is determined (table a or table b in this example) from among the PWM Duty table 21.

The light modulation control circuit 23 outputs thus determined lighting duty to the PWM signal generation circuit 24 outputs the determined current value to the LED current control circuit 25. Note that, the PWM Duty table 21 and the LED current table 22 are not limited to the description form shown in FIG. 3 and FIG. 4, and it is controllable in the light modulation control circuit 23 even with one table, for example, as long as lighting duty for each current value and light modulation setting value (or luminance ratio) is defined for each picture quality mode. Moreover, although an example of storing each table 21, 22 in the memory is given, it is not limited thereto, and in the light modulation control circuit 23, a circuit may be employed in which a current value and lighting duty corresponding to a value shown in each table 21, 22 are determined based on the input light modulation control signal and the mode switching signal.

The PWM signal generation circuit 24 generates a pulse signal according to the input lighting duty to be output to the LED driving portion 15. The LED current control circuit 25 generates a current control signal for controlling a current to be the input current value to be output to the LED driving portion 15.

The LED driving portion 15 includes an LED voltage generation circuit 31 and an LED driver 32. The LED driver 32 outputs a signal to generate an LED driving voltage according to a required LED current based on the current control signal input from the LED current control circuit 25. The LED voltage generation circuit 31 outputs the driving voltage to the LED 41 according to the input signal. Whereas the LED driver 32 outputs the pulse signal input from the PWM signal generation circuit 24 to the LED 41. Thereby, to the LED 41, a current at the current value determined in the light modulation control circuit 23 is applied according to the PWM signal with a pulse width of the lighting duty determined in the light modulation control circuit 23, so as to be lighted/lighted out.

In this way, the LED control portion 14a drives the LED driving portion 15 with reference to the value of each table 21, 22 based on the light modulation control signal and the mode switching signal, and the LED driving portion 15 drives the LED 41.

Then, in the present invention, a current value at which the lighting duty is 100% at the point of the maximum luminance value (luminance ratio is 60% in this example) for use in the standard mode is included as one setting value. The current value is one illustrated as I2 in the LED current table 22 of FIG. 4.

In the case of driving at the current value I2, then, the table b in the PWM Duty table 21 of FIG. 3 is used. As the result, in the case of controlling by the light modulation control circuit 23 according to the light modulation control signal and when the control is performed with the luminance ratio of 60% (corresponding to ±0 of light modulation setting value in this case) or less, the lighting duty is determined according to a relation shown by a straight line 51a in a graph 50 of FIG. 5. In this manner, it is possible to control the LED to emit light with the luminance indicated by the straight line 52 (the luminance ratio of 60% or less, however).

That is, in the standard mode, the current value I2 is being fixed, and it is controlled to increase the lighting duty toward 100% as the light modulation setting value increases according to the relation indicated by the straight line 51a.

Note that, the graph 50 of FIG. 5 shows an example of a relation between the PWM Duty in the standard mode using the tables of FIG. 3 and FIG. 4, the maximum current and the luminance in the LED current control circuit 25 of FIG. 2. Here, the current value I2 is indicated by the straight line 53a in the graph 50. Further, in the graph 50, the current is not marked with a scale so that only a changing state is shown, and the current value shown in the graph 50 indicates the maximum current value that is able to be flowed in the LED when the lighting duty is 100%. These points are the same in each graph in FIG. 7 to FIG. 9 described below.

Next, it will be briefly described with reference to FIG. 6 that it is possible to improve by the control illustrated in FIG. 5 an efficiency of the backlight light emission so as to reduce power consumption. FIG. 6 (A) is a diagram showing an example of a characteristic of forward voltage-forward current in an LED, and FIG. 6 (B) is a diagram showing an example of a characteristic of forward current-relative luminous flux in an LED. Here, similarly, the example is given in which the standard mode is employed as the above-described specific picture quality mode.

As the characteristic shown in FIG. 6 (B), the relation between the forward current flowing in an LED and the relative luminous flux (brightness) is expressed as a function of convex upward, and the luminous efficiency is deteriorated with an increase of the forward current. For example, in the case of being at 100 mA, the relative luminous flux is 1.4, however, in the case of being twice its amount, which is at 200 mA, the relative luminous flux is 2.0 which is less than twice its amount.

Here, the PWM control is not assumed, and that is, in FIG. 6 (B), the characteristic when the lighting duty is 100% is shown, and when the lighting duty is made to be 50% with the same current value, for example, the brightness becomes almost half of that in the case of lighting duty of 100%. For example, when the relative luminous flux during driving at 100 mA, 100% is 1.4, the relative luminous flux during driving at 100 mA, 50% is about 0.7.

Since the forward current, the lighting duty and the brightness are in such a relation, when power consumption is compared between a case where light emission is performed with a predetermined current value and lighting duty of N % (<100%), and a case where light emission is performed with a less current value and the lighting duty of 100% in order to obtain the same brightness (luminance), the power consumption becomes lower in the case of performing light emission with the decreased current value and the lighting duty of 100%. This is because that the forward voltage and the forward current are in such a relation illustrated as the characteristic of forward voltage-forward current in FIG. 6 (A), and the forward direction voltage of the LED is thereby decreased by the decreased amount of the current value, resulting in a decrease in a required power source voltage value.

The above will be described in a more specific example. In the case of the PWM control, for example, when being at 200 mA and the lighting duty of 100%, the brightness is 2.0, and in order to turn the brightness to 1.4, at 200 mA, the lighting duty may be turned to 70%. Instead, the current value may be changed to 100 mA with the lighting duty of 100%. Description will be given for that either one has less power consumption. In FIG. 6(A), it is 3.5 V in the case of being at 200 mA, and 3.0 V in the case of being at 100 mA. Therefore, in the case of being at 200 mA with the lighting duty of 70%, 200 mA×3.5 V×70%=490 mW, whereas in the case of being at 100 mA with the lighting duty of 100%, 100 mA×3.0 V×100%=300 mW. Therefore, the power consumption is lower in the case of being at 100 mA with the lighting duty of 100%. In this manner, for obtaining the same brightness, the power consumption becomes lower in the case of performing light emission with the decreased current value and the lighting duty of 100%.

Having described with reference to the graph 50 in FIG. 5, and in the case of driving in the standard mode with the relation indicated by a straight line 51c kept being extended to a darker side, the required current value (I1) is, as indicated by a straight line 53c in the graph 50, larger than the current value I2 (current value corresponding to the straight line 53a) in the case of driving with the relation indicated by the straight line 51a, and the voltage which is required to flow the current value I1 also becomes larger. Therefore, in the present invention, control is performed in the standard mode using the current value I2 that is smaller than the current value I1, and instead, the lighting duty is increased compared with the case of driving at the current value I1. The current value I2 then becomes the current value for performing light emission at the maximum luminance value for use in the standard mode with the lighting duty of 100%.

In this manner, in the standard mode, the current value is set so that the lighting duty is 100% at the maximum luminance value for use in the standard mode, and the power consumption in the standard mode is thus able to be lowered. Accordingly, with the liquid crystal display device 1 of the present invention, at the time of controlling the luminance to be one which is corresponding to the picture quality by combining the PWM system and the current value control system, the power consumption needed in lighting the LED is able to be reduced. Furthermore, since control such as that luminance is dropped in order to lower the power consumption is not performed, energy saving is thus able to be realized without causing a user to feel a sense of discomfort or presenting inconvenience.

Next, a preferred control example of the LED control portion 14a will be described with reference to FIG. 5 again. During an operation in the above-described specific picture quality mode, when there is a need to change a luminance value to one exceeding the above-described maximum luminance value (corresponding to luminance ratio of 60% in the example of FIG. 5) (namely, in the case of being impossible to handle with the current value), the LED control portion 14a performs control using a current value which is for use in another specific picture quality mode (higher current value). It is assumed to be possible to handle the changing with the high current value. Of course, not only the high current value, but also a value of lighting duty for a light modulation setting value for use in the "another specific mode" is also used to perform control. At this time, video processing in the video signal processing portion 13 may be performed so as to be matched with the picture quality mode as it is, and only the luminance control may be performed so as to be operated in the above-described another specific picture quality mode.

In FIG. 5, the dynamic mode is taken as another specific picture quality mode described above, however it is not limited thereto. The current value I1 for use in the dynamic mode is higher than the current value I2, and when the brightness is increased to be larger so as to exceed the current ratio of 60%, as understood by a transition from the straight line 51a to the straight line 51c and a dotted line in the table 21 of FIG. 3, the lighting duty is lowered once and the lighting duty becomes 100% at the luminance ratio of 100%. In this manner, it is possible to control an LED to perform light emission with the luminance indicated by the straight line 52 (note that, here, because description is given by ignoring the straight line 51b described below, the luminance ratio of 60% to about 65% is excluded).

In this manner, even though the standard mode is used, for example, there is a case where exceeding the maximum luminance set in the standard mode is required depending on the user light modulation operation by the operation portion 12 or a detection result by the external light illuminance detection portion 16, and in such a case, by using the current value in the dynamic mode, the luminance is able to be increased without causing a user to feel a sense of discomfort.

Additionally, such control may be executed not only among the standard mode and the dynamic mode, but also in another picture quality mode at the same time. Thereby, for example, when a picture quality mode with the lighting duty of 100% at a luminance ratio of 40%, the standard mode, and the dynamic mode are settable in the liquid crystal display device 1, control thereof is able to be performed in such a relation that there occurs three times a peak (100%) of the lighting duty with an increase of the brightness according to the user light modulation or the like. In this manner, the lighting duty may be controlled to have a peak (lighting duty of 100%) of n-times which is three times or more and the current value may be switched in n-steps.

Next, the straight lines 51b and 53b in the graph 50 of FIG. 5 will be described. The straight line 51b is the straight line connecting a discontinuous area (luminance ratio of 60% to 65% in this example) between the straight line 51a and the straight line 51c. Further, the current value may be calculated in advance from the lighting duty indicated by the straight line 51b, and a current value of the discontinuous area described above is indicated by the straight line 53b. In this way, the lighting duty and the current value are prepared also for the part of the straight line 51b, and even in the case where light emission is required to be performed with any of the luminance indicated by the straight line 52 due to the user light modulation or the like, it is possible to handle the case.

Moreover, when changing a current value, it is preferable for the LED control portion 14a in FIG. 2 to change the current value and the lighting duty concurrently and gradually. At this time, the lighting duty and the current value may be switched or the like concurrently with an interval of, for example, about 0.5 second. By such switching, it is possible to reduce a sense of discomfort to be given to a user. An amount of the current value in switching may be changed, for example, by 1 mA per each vertical scanning term (16 ms, for example), and in such a case, assuming that I1=I2+20 mA, for example, and when switching from I2 to I1, it is performed in about 20 vertical scanning terms. Specifically, an image is changed for each vertical scanning term in a television device, thereby it is preferable to perform switching in this unit.

Further, it is preferable for the LED control portion 14a to perform control using a current value for use in the above-described specific picture quality mode, when there is a need to change a luminance value to one less than the maximum luminance value (maximum luminance value for use in the above-described specific picture quality mode) during an operation in the above-described another specific picture quality mode.

Having illustrated in the dynamic mode and the standard mode, it is preferable to perform control with the lighting duty (and the current value described at the same time) in such relation as the straight line 51c, or the straight line 51a in FIG. 5 even in the case of the dynamic mode. Thereby, even during an operation in the dynamic mode, compared with a case where control is performed so that the straight line 51c is extended without any change even in the case of less than a certain value (luminance ratio of 65%, for example), power saving is able to be realized with less than the value (luminance ratio of 65%, for example).

Furthermore, in this case also, when the current value is changed, the current value and the lighting duty are preferable to be changed concurrently and gradually. Moreover, in this example also, the lighting duty may be controlled to have a peak (lighting duty of 100%) of n-times which is three times or more, and roughly speaking (described except a scene in which gradual change is performed), the current value may be switched in n-steps.

Next, for various examples of control patterns in the light emission luminance control which are applicable in the LED backlight of FIG. 2 will be described with reference to FIG. 5 and FIG. 7 to FIG. 9. In any of FIG. 7 to FIG. 9, a relation between PWM-Duty, the maximum current and the luminance is shown.

In the LED, the lower the current value, the more the power-luminance efficiency is improved. Further, in the case of a white LED, a color tone is slightly changed due to the current value. It may be determined what kind of control pattern is employed in consideration of these points. For example, the control pattern may be determined for each model to be mounted or for each picture quality mode.

For example, the light emission luminance control method described in FIG. 5 is an example of a control pattern in which the current value (maximum current value in LED current control circuit 25 of FIG. 2) is changed in several steps, and lighting duty (lighting duty of PWM control in PWM signal generation circuit 24 of FIG. 2) is changed linearly. Such a control pattern is effective in the case where the current switching can be performed only in a stepwise manner. Compared with the case where the current value is fixed to the maximum, it is possible to suppress the power consumption in a part of low luminance.

In the graph 50 of FIG. 5, the part of the straight line 53b corresponds to a transition part, and a change point in the current value is thus substantially one point. Therefore, a change point in the color tone is only one point. In this way, the change point in the current value in the control pattern becomes evident as the change point in the color tone. Accordingly, it is preferable to set the change point to pass in a limited scene such as user adjustment not during a period in which a user is viewing content. Furthermore, the current value is significantly changed in the current value switching part, and it is thus difficult to perform timing control of the lighting duty and the current.

Figure 7:
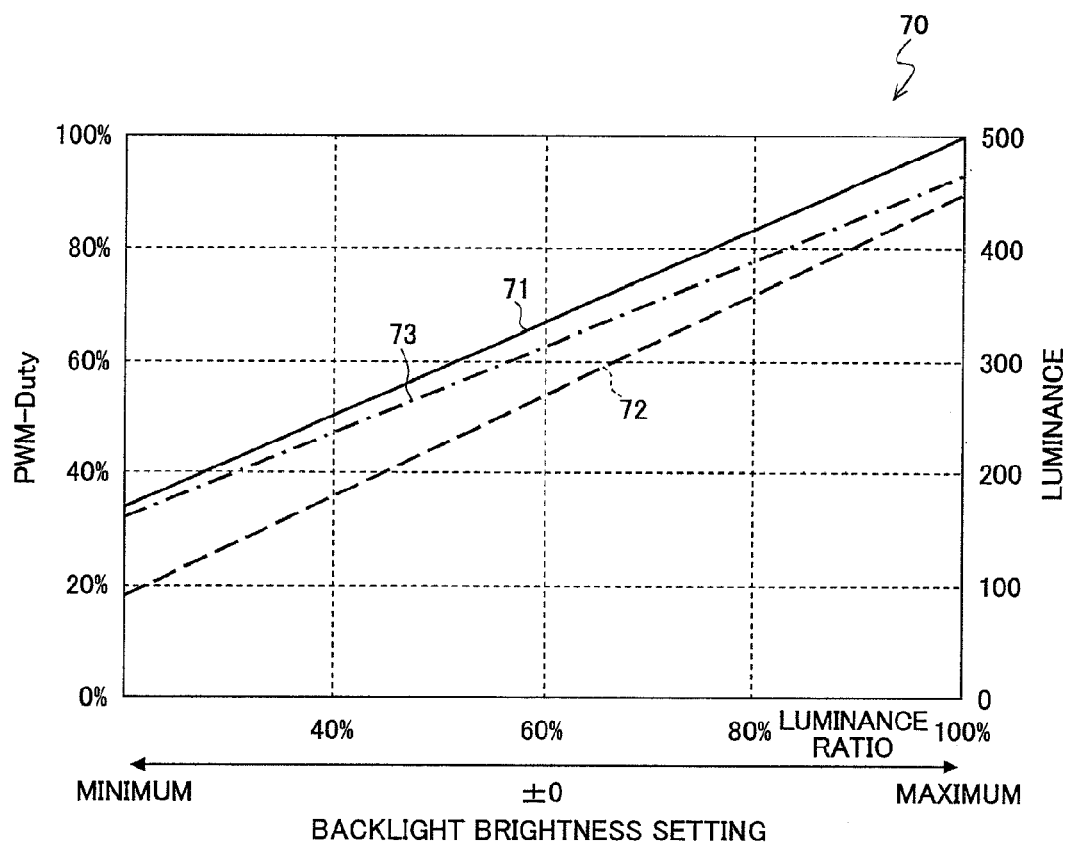
FIG. 7 is a diagram for explaining another example of the light emission luminance control method in the LED backlight of FIG. 2.

In a control pattern shown in a graph 70 of FIG. 7, the lighting duty is changed linearly as indicated by a straight line 71, while the current value is changed linearly as indicated by a straight line 73 so that a luminance value is changed linearly as indicated by a straight line 72. In such a control pattern, the lighting duty and the current value are changed linearly together and there is no discontinuous point therein so that the method of thinking overall is simple, however, current control and voltage control are required all the time. The power consumption is increased from low luminance toward high luminance gradually. In this control pattern, the color tone of the LED also changes gradually, and there is no sudden change of color tone at a certain point. Therefore, this control pattern is appropriate for a control pattern during a period in which a user is viewing content.

Figure 8:
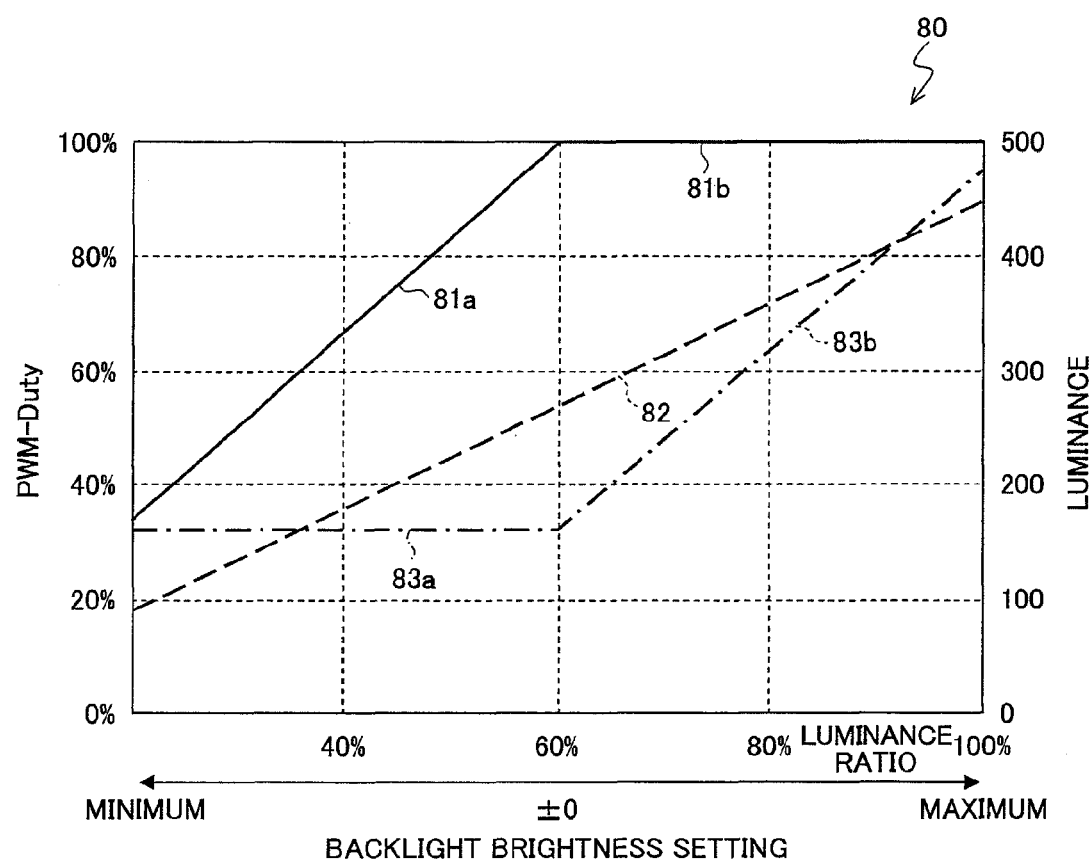
FIG. 8 is a diagram for explaining another example of the light emission luminance control method in the LED backlight of FIG. 2.

In a control pattern shown in a graph 80 of FIG. 8, until a predetermined luminance (luminance ratio of 60% in this example), lighting duty is increased linearly as indicated by a straight line 81a to be the lighting duty of 100% as indicated by a straight line 81b. Then, after becoming the lighting duty of 100%, the current value is increased linearly from a fixed current value indicated by a straight line 83a to one shown by a straight line 83b. In the control pattern, with such a change in the current value and the lighting duty, the luminance value is changed linearly as indicated by a straight line 82. This control pattern has the lowest current value throughout the whole, and is able to reduce the power consumption most from the power-luminous efficiency characteristic of an LED. Further, in the control pattern, only either one of the voltage control or the current control is performed in each point, and therefore the control is easy. Generally, there is a tendency that change in the color tone is conspicuous and disturbing in the low luminance, and thereby the control pattern in which a current value in that part is fixed may be said to be appropriate control for the color tone.

Figure 9:
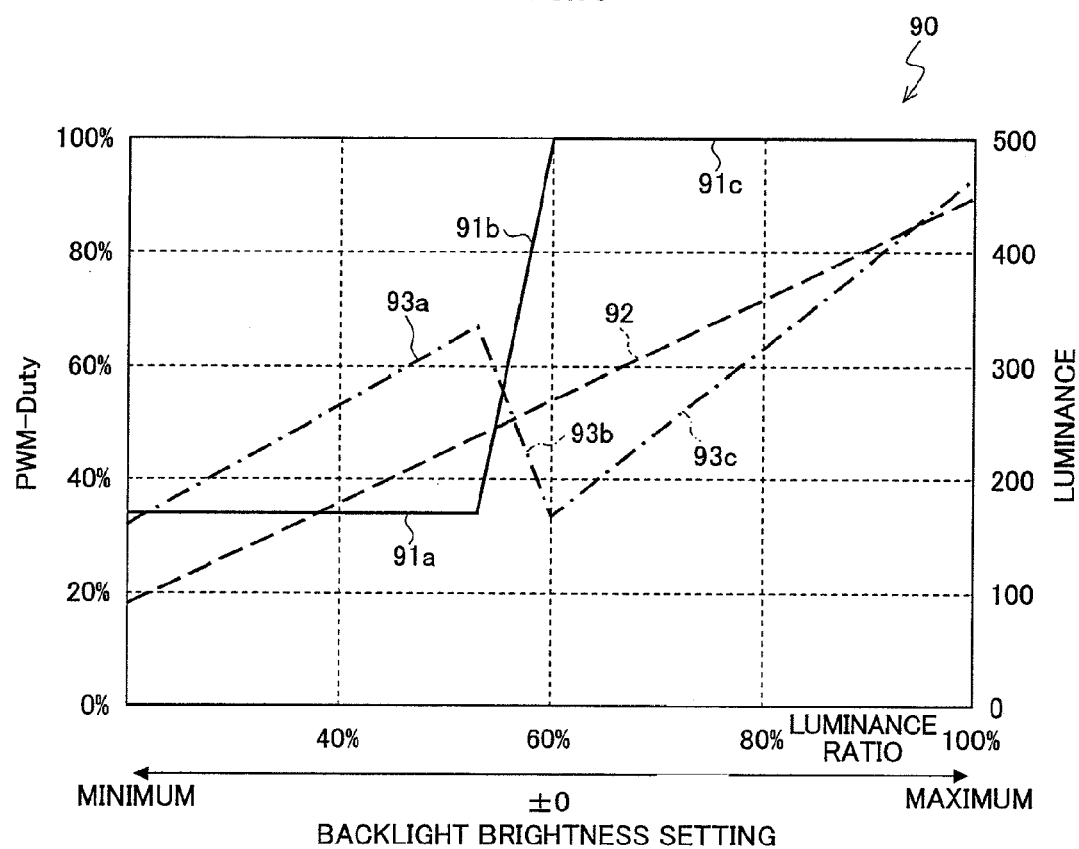
FIG. 9 is a diagram for explaining another example of the light emission luminance control method in the LED backlight of FIG. 2.

In a control pattern shown in a graph 90 of FIG. 9, until a predetermined luminance (luminance ratio of 53% in this example), lighting duty is fixed as indicated by a straight line 91a, and a current value is changed linearly as indicated by a straight line 93a. Then, as indicated by a straight line 91b, the lighting duty is increased linearly to have the lighting duty of 100% with another predetermined luminance (luminance ratio of 60% in this example), while the current value is decreased linearly as indicated by the straight line 93b. From the above-described another predetermined luminance, the current value is fixed to 100% as indicated by a straight line 91c, and the current value is increased linearly as indicated by a straight line 93c. In the control pattern, from such a change in the current value and the lighting duty, the luminance value is changed linearly as indicated by the straight line 92. In the graph 90, an example is shown in which significant switching in the lighting duty is performed only once, however, it is possible to switch the lighting duty significantly at points including several steps.

Note that, in such a control pattern, in a case of an attempt to change the brightness with a white LCD or the like, such an attempt is performed directly at the current value of constant current, a balance between exciting light and fluorescent light is lost so that a spectroscopic pattern is fluctuated, and color tone is thereby possibly changed.

Note that, a control pattern similar to the current control pattern indicated by the straight lines 93a, 93b, and 93c in the graph 90 may be realized even by a device in which the PWM control is not performed (device in which the PWM signal generation circuit 24 as illustrated in FIG. 2 is not provided). Thereby, it is possible to make the device less costly. In that case, a current value to generate a voltage to be applied to an LED may be switched like the straight lines 93a, 93b, and 93c or at points including several steps.

Next, another example of the PWM Duty table in the LED backlight of FIG. 2 will be described with reference to FIG. 10. A PMW Duty table 100 illustrated in FIG. 10 is an example of a table for use in the case of providing an AV position and a power saving mode (also referred to as eco mode) in a liquid crystal panel. In the table 100, as a mode other than the standard mode, as described above, the dynamic mode, the game mode, the movie mode and the like correspond, for example.

In the table 100, the current value is adjusted depending on whether an eco mode is in any of "off", "mode 1" and "mode 2". Note that, in the table 100, the current value is assumed to be 100% in a case where the eco mode is off, and a light modulation value is a maximum value (16 in this example), and examples of another current values are relatively shown. When the light modulation value is "16", the current values in the case of the eco mode being off, mode 1, and mode 2 are respectively assumed to be 100%, 80% and 60%.

In this way, in the example of the table 100, in addition to changing the duty according to a light modulation value, the current value is changed based on the setting content of the eco mode, thus the power efficiency is improved while the linearity of the luminance change is maintained. Accordingly, the control as illustrated in the table 100 is executed so that power saving is able to be realized.

Further, in the example of the table 100, when the eco mode is off, in the case where the AV position is in the standard mode, the current value is switched according to the light modulation value to realize power saving, and in the case of being a mode other than the standard mode, the current value is fixed. Accordingly, when the AV position is in the standard mode, even when the eco mode is on (mode 1 or mode 2), a current value according to the light modulation value is required to be used and each current value to be used there is set to be lower than each current value to be used when the eco mode is off.

It is thereby possible to provide a coherent operation without causing a user to feel a sense of discomfort.

Additionally, in FIG. 10, examples of values are shown on the assumption that the duty luminance characteristic is constant in each current value, however, when the duty luminance characteristic changes in each current value, a Duty table may be set for each current value.

Furthermore, FIG. 11 is a diagram showing an arrangement example of a backlight applicable to the liquid crystal display device of the present invention. The LED backlight 10 which arrangement is illustrated in FIG. 11 is configured as an array type LED backlight. Note that, the liquid crystal display device of the present invention is not limited to the example described here, and a matrix type LED backlight which is a substrate with almost the same size as the screen paved with LEDs, etc., is able to be mounted.

In the LED backlight 10, a plurality of LED substrates 101 on each of which a plurality of white LEDs 102 being mounted are arranged on a chassis 105. The LED substrate 101 has a shape of a horizontally long rectangular reed, and is arranged so that the longitudinal direction of the rectangle corresponds to the horizontal direction of a screen of a liquid crystal display device. Further, a harness 103 is provided for connecting between the LED substrates 101 halved in the horizontal direction, and a harness 104 is further provided for connecting one of the LED substrates 101 and an external driver substrate. Moreover, a connector 106 to which the harness 103 and the harness 104 are connected is arranged on each LED substrate 101. Note that, the halving in the transverse direction of the LED substrate 101 as illustrated in FIG. 11 is not essential in the liquid crystal display device according to the present invention.

EXPLANATIONS OF REFERENCE NUMERALS

1 . . . liquid crystal display device; 10 . . . LED backlight (backlight portion); 11 . . . tuner portion; 12 . . . operation portion; 13 . . . video signal processing portion; 14 . . . main control portion; 14a . . . LED control portion; 15 . . . LED driving portion; 16 . . . external light illuminance detection portion; 17 . . . liquid crystal control portion; 18 . . . liquid crystal panel; 21 . . . PWM Duty table; 22 . . . LED current table; 23 . . . light modulation control circuit; 24 . . . PWM signal generation circuit; 25 . . . LED current control circuit; 31 . . . LED voltage generation circuit; 32 . . . LED driver; 41 . . . LED; 50 . . . graph; 51a, 51b, 51c . . . straight line; 101 . . . LED substrate; 102 . . . LED; 103, 104 . . . harness; 105 . . . chassis; and 106 . . . connector.

The invention claimed is:

1. A liquid crystal display device having a liquid crystal panel for displaying an input video signal, a light source of a light-emitting diode for irradiating the liquid crystal panel, and a light emission luminance control circuit for controlling light emission luminance of the light-emitting diode, wherein, the light emission luminance control circuit controls the light emission luminance of the light-emitting diode with both a Pulse Width Modulation system in which duty indicating a lighting time per cycle in a pulse to turn on/off the light-emitting diode is changed, and a current value control system in which a value of a current to be flowed to the light-emitting diode is selected from among a plurality of setting values, the light emission luminance control circuit receiving a mode switching signal and a light modulation control signal, wherein the mode switching signal indicates an eco mode and a plurality of quality modes including a first quality mode and a second quality mode, the Pulse Width Modulation system adjusting the duty according to the light modulation control signal, the quality mode and the eco mode, the current value control system selecting the current value according to the light modulation control signal, the quality mode and the eco mode.

2. A liquid crystal display device as defined in claim 1, wherein the first quality mode is a picture quality mode which is provided as a mode most frequently used by a user.

3. A liquid crystal display device as defined in claim 1, wherein when changing a current value, the light emission luminance control portion changes the current value and the duty concurrently and gradually.

4. A liquid crystal display device as defined in claim 1, wherein in response to the mode switching signal indicating that the eco mode is on, the current value control system selects a setting value less than a setting value selected when the eco mode is off, wherein in response to the mode switching signal indicating that the first quality mode is selected, the current value control system selects between a first setting value and a second setting value based on the light modulation value while the PWM system controls the duty such that the duty reaches a maximum value for each of the first and second setting values selected by the current value control system, wherein in response to the mode switching signal indicating that the second quality mode is selected, the current value control system selects a third setting value based on the eco mode and regardless of the light modulation value.

5. A liquid crystal display device as defined in claim 1, the eco mode including a first eco mode, a second eco mode and an off eco mode wherein the eco mode is off, wherein the current value control system selects a setting value for the second eco mode that is less than a setting value for the first eco mode which, in turn, is less than a setting for the off eco mode.

6. A liquid crystal display device as defined in claim 1, wherein the light modulation control signal is based on a brightness setting or an ambient light level.

* * * * *